July 12, 1932. E. L. NEUMEISTER ET AL 1,867,168
HAY CUTTER AND DISTRIBUTOR
Filed Dec. 12, 1930   2 Sheets-Sheet 2
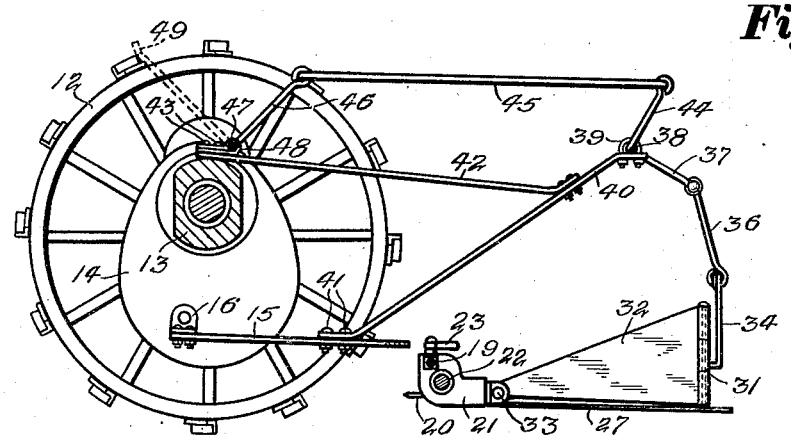
Fig.2.
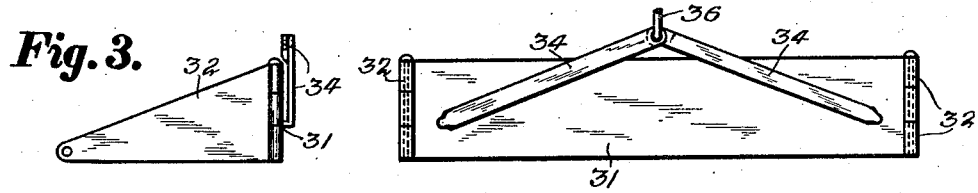
Fig.3.   Fig.4.
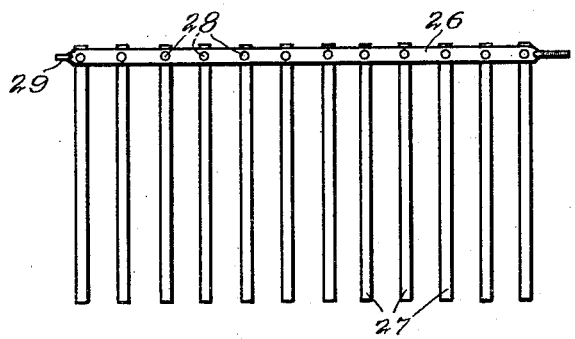   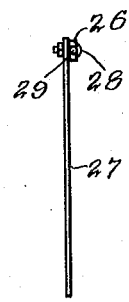
Fig.5.   Fig.6.
Inventor
E.L.Neumeister
By A.W.Neumeister
Arthur H. Sturges Attorney Patented July 12, 1932

1,867,168

UNITED STATES PATENT OFFICE

EARL L. NEUMEISTER AND ANTON W. NEUMEISTER, OF PHILIP, SOUTH DAKOTA

HAY CUTTER AND DISTRIBUTOR

Application filed December 12, 1930. Serial No. 501,980.

The present invention relates to agricultural machines or devices, and has particular reference to an attachment for application to tractor operated cutters for hay and the like.

In the cutting of hay and grain, at the present time the field is covered with a tractor driven and carried sickle which merely cuts the hay and leaves it in the field, necessitating the covering of the entire field a second time with a dump rake or the like for picking up and gathering the hay or other grain into bunches.

An object of the present invention is to do away with this second operation and thus reduce the time, labor and consequent costs of gathering and bunching the hay.

Another object of the present invention is to provide a hay gatherer and buncher adapted for attachment to a sickle and the tractor operating the same and wherein the attachment is under the entire control and operation of a single attendant riding on the tractor.

Another object of the present invention is to provide a hay gatherer and buncher which may be connected in trailing relation to a sickle for receiving the hay as it is cut and which is provided with a hinged enclosure for the rear and sides of the gatherer adapted to be swung upwardly at times by the attendant for releasing the accumulation of hay so that the latter may be left upon the field in bunches or stacks of the desired size.

With the foregoing and other objects in view, the invention will be more fully described hereinafter, and will be more particularly pointed out in the claims appended hereto.

In the drawings, wherein like symbols refer to like or corresponding parts throughout the several views.

Figure 2 is a longitudinal section taken through the same on the line 2—2 of Figure 1 and looking toward the attachment.

Figure 3 is a detail side elevation of the pivoted frame of the gatherer.

Figure 4 is a rear elevation of the same.

Figure 5 is a detail plan view of the slatted bottom of the gatherer, and

Figure 6 is an end view of the same.

Figure 1:
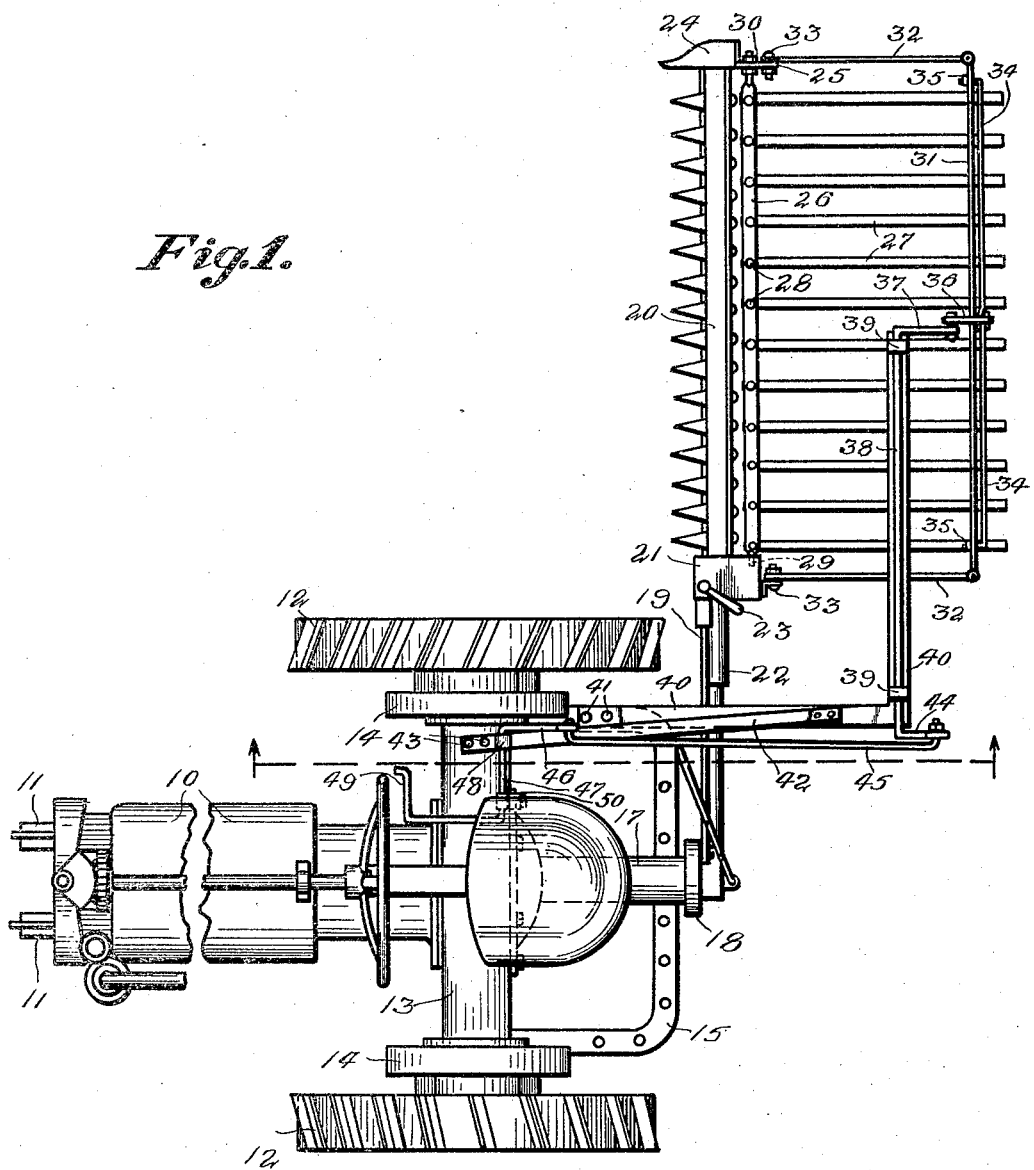
Figure 1 is a top plan view of a tractor and sickle of the usual type equipped with the gatherer and buncher of the present invention.

Referring now to the drawings, the device of this invention is adapted to be supported and operated from a tractor of any suitable type, the present drawings showing a tractor provided with an engine 10 and having front wheels 11 and rear wheels 12 interconnected by an axle and transmission housing 13. The housing 13 is equipped at opposite ends with gear boxes 14 which carry the opposite ends of a rearwardly extending drawbar 15. The drawbar 15 is substantially U-shape and is secured at its forward ends by means of clips 16 to the inner opposite side of the gear boxes 14. Secured to and projecting rearwardly from the axle housing 13 is a sleeve 17 of the usual type in which a take-off power shaft is mounted and which is connected to a disk 18 having eccentric connection to a pitman or connecting rod 19 which extends laterally to a sickle 20 of conventional form.

The sickle 20 is provided with a supporting block 21 connected by an arm 22 to the rear end of the tractor, and the block 21 is adjustable upon the arm and adapted to be secured in adjusted position by a suitable clamp 23. The outer end of the sickle 20 is equipped with the usual shoe 24 from which the usual toe board has been removed, and the shoe 24 is provided with a rear arm 25 which is apertured in the usual manner.

The gatherer is provided with a slatted bottom, shown in detail in Figures 5 and 6, and which comprises a cross bar 26 to which are secured the forward ends of slats 27. Preferably, the bar 26 is of strap iron while the slats 27 may be of hard wood or the like. The slats are secured to the bar 26 by means of bolts 28 or the like, and one end of the bar 26 is reduced and rounded to provide a pivot pin 29 adapted to seat in a correspondingly shaped opening or socket at the inner side of the block 21 immediately behind the sickle box 20. The other end of the bar 26 is reduced, rounded and threaded for engagement through the forward opening of the arm 25 and is adapted to carry a pair of clamping nuts 30 thereon for engagement against the opposite sides of the arm 35. The rear ends of the slats 27 are left free and are adapted to trail on the ground so that when desired the accumulations of hay or the like on the upper sides of the slats may slide downwardly and backwardly from the bottom of the gatherer and rest in bunched form on the ground.

The gatherer is provided with an enclosing or box structure which extends across the back and at opposite sides thereof. This box-like structure comprises a back plate 31 which is of suitable height and which extends across and beyond the opposite ends of the slatted bottom. To the opposite ends of the back plate 13 are hingedly connected a pair of end plates 32 which, as shown in Figure 3, are beveled forwardly at their upper edges and are of sufficient length to support the back plate 31 across the upper sides of the slats 27 near the rear ends of the slats. The forward ends of the side plates 32 are pivoted coaxially upon bolts 33 which are respectively mounted upon the block 21 and the arm 25 at opposite ends of the sickle 20.

Means is provided for raising and lowering the box structure on the bolts or pivots 33. The means embodies a pair of links 34 which are pivotally connected at their outer ends to the back plate 31, and this may be accomplished by reducing the ends of the links and bending them at right angles for passage through suitable openings in the back plate and mounting nuts 35 upon the inturned ends of the links.

A link rod 36 pivotally connects the adjacent ends of the links 34, and the latter converge upwardly from the back plate 31 and the rod 36 extends upwardly from such point and is pivotally connected at its upper end to a crank arm 37 mounted on a rod 38 which extends toward the tractor.

The arm 38 is mounted in suitable U-bolts 39 or other pins carried on a bracket 40, the latter being in the form of an L-shape arm with one end extending into overhanging relation with respect to the gatherer while the other end extends forwardly and downwardly and is secured by bolts 41 to the adjacent side portion of the drawbar 15. The bracket 40 is held in desired position by a brace bar 42 which is secured to the bracket 40 near its rear end, as shown in Figure 2, and which extends forwardly to the upper side of the axle housing 13 and is secured thereto by bolts 43.

The inner end of the pivotally mounted rod 38 is provided with a second arm 44 which extends upwardly from the bracket 40 and is connected by a rod 45 to an upwardly extending arm 46 of a rocker shaft 47. The rocker shaft 47 extends lengthwise against the axle housing 13 and is pivotally supported near the arm 46 in a clip 48 which may be secured beneath the bolts 44 and upon the upper side of the brace bar 42. The other end of the shaft 47 is provided with a foot lever 49 and is pivotally supported adjacent the foot lever upon a bearing clip 50 which is bolted or otherwise suitably secured to the side of the axle housing 13. The foot lever 39 is given any suitable configuration to bring the same within easy reach of the foot of the operator or attendant.

In operation, when the tractor with its sickle 20 is moved over the field and the hay or other material is cut, the hay falls backwardly onto the slatted bottom and is confined thereon by means of the boxing. As soon as the desired amount of the hay has accumulated upon the bottom, the attendant merely pushes forwardly on the foot lever 49, swinging the arm 46 forwardly, drawing the rod 45 therewith and turning the rod shaft 38 so as to raise its arm 37 and through the links 36 and 34 raise the box structure on its pivots 33.

The box structure is raised sufficiently to clear the lower edge of the back plate 31 from the accumulated hay so that the latter in bunched form may slide rearwardly from the slats 27. The operator now releases the foot lever 49 so that the box structure may drop back into place on the slats 27 and the operation may thus be repeated indefinitely. The operator is thus permitted to accumulate and deposit bunches of hay of the desired size and at desired points, and it is unnecessary to again cover the field with a dump rake or the like device for collecting and bunching the hay.

It is obvious that various changes and modifications may be made in the details of construction and design of the above specifically described embodiment of this invention without departing from the spirit thereof, such changes and modifications being restricted only by the scope of the following claims.

What is claimed is:

1. A hay gatherer comprising a slatted bottom, means for pivotally mounting the bottom at the rear side of the sickle, a buncher box arranged over the bottom and having a back plate and pivotally connected end plates, means for pivotally connecting the forward ends of the end plates to the opposite end portions of the sickle whereby the buncher box may adjust itself to the slatted bottom, a bracket structure adapted to be mounted in overhanging relation to the bottom, and means carried by the bracket structure and connected to the buncher box for swinging the same upwardly from the bottom at times.

2. A hay gatherer comprising a slatted bottom, means for pivotally connecting the forward edge of the bottom to the rear side of the sickle, a U-shape enclosure structure, means for pivotally mounting the free ends of the U-shape structure to the opposite end portions of the sickle above the slatted bottom and the enclosing structure adapted to seat across the rear end portion of the bottom, and means for raising and lowering the enclosure structure.

3. A hay gatherer for mounting upon a tractor operated sickle, comprising a slatted bottom, means for connecting the forward edge portion of the bottom to the rear side of the sickle, a back plate, a pair of end plates hingedly connected to the opposite ends of the back plate and extending forwardly therefrom, means for pivotally connecting the forward ends of the end plates to the opposite ends of the sickle for supporting the end and back plates for mounting the bracket on a tractor adjacent the sickle and with a portion of the bracket overhanging the slatted bottom, a rock shaft carried by the bracket, links arranged between one end of the rock shaft and said back plate, a foot lever structure, means for mounting said structure and said rock shaft for raising and lowering the back and side plates by operation of the foot lever structure.

4. A hay gatherer and buncher, comprising a slatted bottom, means for pivotally mounting the slatted bottom at the rear side of a sickle, a buncher box arranged over the bottom and having a back-plate and pivotally connected end plates, means for pivotally connecting the forward ends of the end plates to the opposite end portions of the sickle whereby the buncher box may adjust itself to the slatted bottom, a bracket structure adapted to be mounted in overhanging relation to the bottom, and a pair of links pivotally connected at their outer ends to the back plate for raising and lowering the enclosure structure.

In testimony whereof, we affix our signatures.

EARL L. NEUMEISTER.
ANTON W. NEUMEISTER.